: US010184432B2

(12) United States Patent
Yang et al.

(10) Patent No.: US 10,184,432 B2
(45) Date of Patent: Jan. 22, 2019

(54) INTERCOOLER ASSEMBLY FOR VEHICLE

(71) Applicant: HYUNDAI MOTOR COMPANY, Seoul (KR)

(72) Inventors: Seng-Joo Yang, Hwaseong-si (KR); Hye-Dong Nam, Bucheon-si (KR); Jin-Kwan Lee, Hwaseong-si (KR); Dang-Hee Park, Seoul (KR); Su-Whan Kim, Hwaseong-si (KR)

(73) Assignee: Hyundai Motor Company, Seoul (KR)

( * ) Notice: Subject to any disclaimer, the term of this patent is extended or adjusted under 35 U.S.C. 154(b) by 239 days.

(21) Appl. No.: 14/664,212

(22) Filed: Mar. 20, 2015

(65) Prior Publication Data

US 2016/0061150 A1 Mar. 3, 2016

(30) Foreign Application Priority Data

Aug. 28, 2014 (KR) ........................ 10-2014-0113393

(51) Int. Cl.
*F02M 26/22* (2016.01)
*F02M 26/04* (2016.01)
*B60K 13/02* (2006.01)
*F02B 29/04* (2006.01)
*F02M 26/31* (2016.01)

(52) U.S. Cl.
CPC ............. *F02M 26/04* (2016.02); *B60K 13/02* (2013.01); *F02B 29/0456* (2013.01); *F02M 26/31* (2016.02); *Y02T 10/146* (2013.01)

(58) Field of Classification Search
CPC ........... F02M 25/0736; F02M 25/0707; F02M 26/04; F02M 26/31; B60K 13/02; Y02T 10/146; F02B 29/0456

USPC ................................................... 123/568.12
See application file for complete search history.

(56) References Cited

U.S. PATENT DOCUMENTS

| 4,452,216 A * | 6/1984 | Patchen, II ........ F02B 29/0462 123/545 |
| 4,831,981 A * | 5/1989 | Kitano ................... B60K 11/00 123/198 E |
| 5,058,558 A * | 10/1991 | Ueda ...................... F02B 67/06 123/559.1 |
| 5,072,698 A * | 12/1991 | Fujihira ................. B60K 11/06 123/184.55 |
| 7,523,798 B2 * | 4/2009 | Muramatsu ........... B60K 11/08 180/68.1 |
| 7,648,174 B2 * | 1/2010 | Tanaka .................... F16L 33/02 285/23 |
| 7,699,036 B2 * | 4/2010 | Bock .................. F02B 29/0425 123/184.61 |

(Continued)

FOREIGN PATENT DOCUMENTS

| JP | 10-129236 A | 5/1998 |
| JP | 2001-039171 A | 2/2001 |

(Continued)

*Primary Examiner* — David Hamaoui
*Assistant Examiner* — Susan Scharpf
(74) *Attorney, Agent, or Firm* — McDermott Will & Emery LLP

(57) ABSTRACT

An intercooler assembly for a vehicle includes an intercooler, and a duct connected to a front side of the intercooler and guiding outside air to the intercooler. The duct is in surface-contact with an outer surface of the intercooler, at which the air flowing into the duct flows out to the intercooler.

7 Claims, 12 Drawing Sheets

(56) References Cited

U.S. PATENT DOCUMENTS

| | | | | |
|---|---|---|---|---|
| 2006/0086548 | A1* | 4/2006 | Muramatsu | B60K 11/08 180/68.1 |
| 2008/0209690 | A1* | 9/2008 | Tanaka | F16L 33/02 24/16 PB |
| 2008/0236163 | A1* | 10/2008 | Bock | F02B 29/0425 60/599 |

FOREIGN PATENT DOCUMENTS

| | | |
|---|---|---|
| JP | 2007-092642 A | 4/2007 |
| KR | 10-2011-0043923 A | 4/2011 |
| KR | 10-2012-0063116 A | 6/2012 |
| KR | 10-1189244 B1 | 10/2012 |
| KR | 10-2013-0028424 A | 3/2013 |

* cited by examiner

<BEFORE COLLISION>       <AFTER COLLISION>

INTERCOOLER ASSEMBLY FOR VEHICLE

CROSS-REFERENCE TO RELATED APPLICATION

This application claims the benefit of priority to Korean Patent Application No. 10-2014-0113393, filed on Aug. 28, 2014, the entire contents of which is incorporated herein by reference.

TECHNICAL FIELD

The present disclosure relates to an intercooler assembly for a vehicle in which an intercooler is connected to a duct which flows air into the intercooler, more particularly, an intercooler assembly for a vehicle that can prevent a leakage of air flowing in between an intercooler and a duct and prevent breakage of the intercooler by the duct at a low speed collision

BACKGROUND

A turbocharger for a vehicle increases intake air pressure by using the exhaust gas of an engine, and an intercooler of a vehicle cools the air supplied to the engine by a compressor of the turbocharger.

The air pressurized by a compressor flows into an interior of the intercooler, and external air flows to outside of the intercooler, and thus, a temperature of the air flowing into the interior of the intercooler decreases, thereby increasing charging efficiency of the air flowing to the engine.

Referring to FIGS. 1 to 3, a duct 120 for guiding outside air to an intercooler 110 is fastened to a front side of the intercooler 110.

However, according to the intercooler assembly for a vehicle of the related art, since the duct 120 is mounted to only the front side of the intercooler 110 as shown in dotted box A of FIG. 2, there is a slight gap through which some of the air flowing into the duct 120 leak to the outside and may not flow to the intercooler 110. Cooling efficiency of the intercooler 110 due to the leakage of the air decreases, and thus, fuel efficiency also decreases.

In addition, when the duct 120 is fasten to the intercooler 110, as shown in FIG. 3, a tool must be used during assembly to fasten a fastening bolt 121 and fitting protrusions 122, thus deteriorating assembling workability and maintainability.

Further, referring to FIG. 4, since the duct 120 is fastened to the front side of the intercooler 110 by the fastening bolt 121, the intercooler 110 may be damaged while the duct 120 is pushed toward the intercooler 110. For example, an impact force at the low speed collision such as a minor collision is transmitted to the duct 120 through a bumper and the like, the duct 120 is pushed toward a rear side of the vehicle in response to the impact force of the collision, that is, pushed toward the intercooler 110, and therefore the intercooler 110 may be damaged.

SUMMARY

An aspect of the present inventive concept provides an intercooler assembly for a vehicle capable of improving cooling efficiency of an intercooler by preventing the a leakage of air at which a duct and an intercooler are fastened to each other, improving assembling workability, and preventing breakage of the intercooler at a low speed collision.

An intercooler assembly for a vehicle according to the present disclosure includes an intercooler, and a duct detachably connected to a front side of the intercooler and guiding outside air into the intercooler. The duct is n surface-contact with upper and lower surfaces of the intercooler, at which the air flowing into the duct flows out to the intercooler.

A fastening plate may be connected to the duct and extend from a rear end of the duct toward the intercooler. The fastening plate may surface-contact the upper and lower surfaces of the intercooler.

Fastening protrusions may protrude from the outer surface of the intercooler. Fastening holes may be formed to fasten with the fastening protrusions at the fastening plate, and sliding slots may communicate with the fastening holes and extending from the fastening holes toward a front side of the duct.

The fastening holes may communicate with the sliding slots at a stepped portion formed between the fastening holes and the sliding slot.

A slope may be formed at a rear end of the fastening plate. The slope may be inclined toward the rear end of the fastening plate from the fastening holes such that a thickness of the fastening plate decreases toward the rear end of the fastening plate The fastening plate may be provided on upper and lower sides of the duct to avoid contact with which a pipe is mounted to side surfaces of the intercooler.

A fastening guide extends from left and right sides of the intercooler to which the pipe is mounted, and the fastening guide has an end being bent inwardly toward the upper surface of the intercooler to support upper and lower surfaces of the fastening plate.

A sealing guide may be mounted to left and right sides of the intercooler to which the pipe is mounted. A flexible connector may be mounted to left and right sides of the duct at the part where the fastening plate is not formed at the duct.

The duct may be fastened to the intercooler and an outer surface of the flexible connector is in contact with the inner surface of the sealing guide.

According to the intercooler assembly of the vehicle in accordance with the present disclosure having the configuration as described above, by sealing the intercooler and the duct due to surface-contact, all of the air flowing into the duct can flow into the intercooler without leakage, thus improving cooling efficiency and fuel efficiency.

Further, at the low speed collision, the duct may slide toward the intercooler by a slot formed in the duct, thus preventing the intercooler from being damaged.

In addition, when fastening the duct to the intercooler, it is possible to fasten without a separate tool, thereby improving assembling workability.

DETAILED DESCRIPTION

Figure 1:
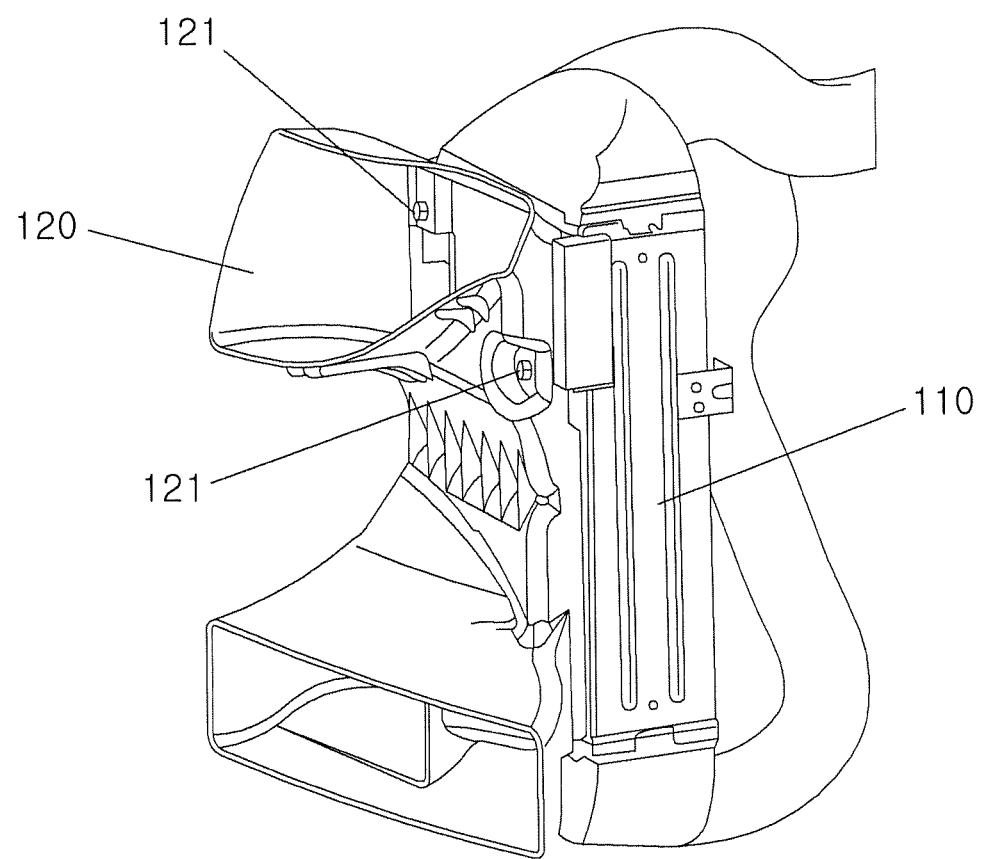
FIG. 1 is a perspective view of an intercooler assembly for a vehicle in accordance with the related art.
Figure 2:
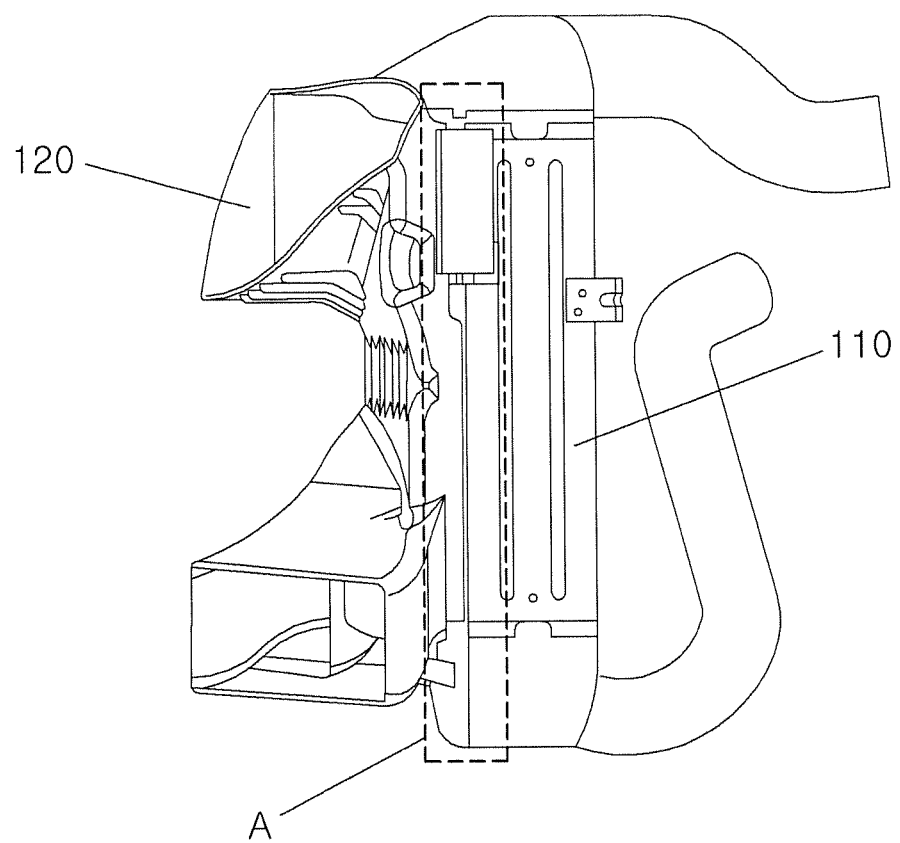
FIG. 2 is a side view of an intercooler assembly for a vehicle in accordance with the related art.
Figure 3:
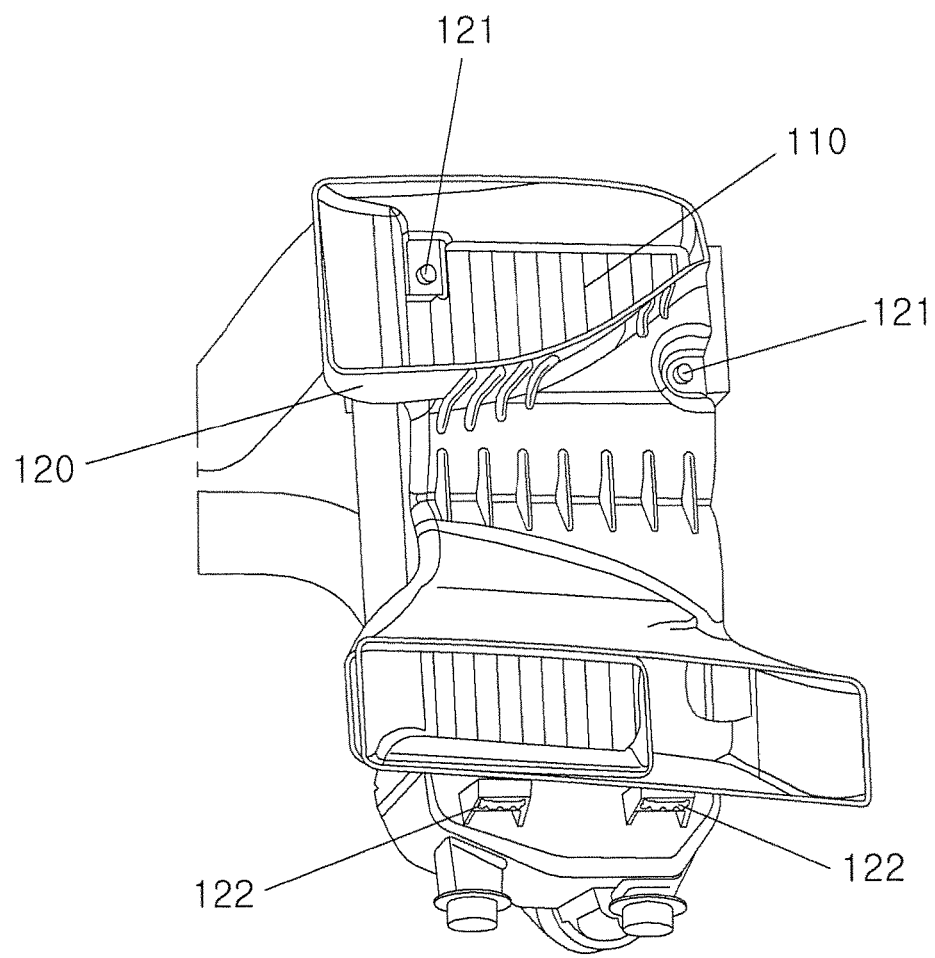
FIG. 3 is a front view of an intercooler assembly for a vehicle in accordance with the related art.
Figure 4:
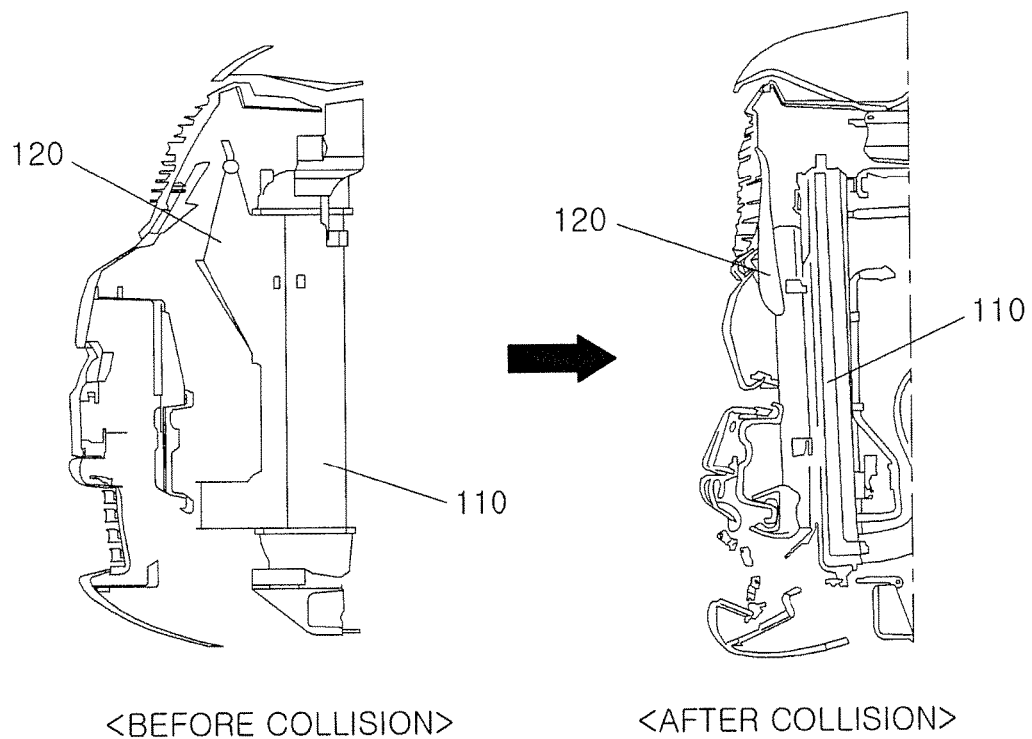
FIG. 4 is a side cross-sectional view showing a state which an intercooler assembly for a vehicle is being damaged during a low speed collision in accordance with the related art.

Hereinafter, an intercooler assembly for a vehicle in accordance to exemplary embodiments of the present inventive concept will be described below in more detail with reference to the accompanying drawings.

Referring to FIGS. 5 to 8, an intercooler assembly for a vehicle of the present disclosure comprises an intercooler 10 upper and lower surfaces of which and a duct 20 are connected, by which air is emitted from the duct 20.

Since the connection of the intercooler 10 and the duct 20 is made by surface-contacting of the upper and lower surfaces of the intercooler 10 and the duct 20, a leakage of air may be prevented between the intercooler 10 and the duct 20. In the related art, the intercooler and the duct are not surface-contacted such that some of the air flowing into the duct 20 is leaked through a gap between the intercooler 10 and the duct 20. However, in the present disclosure as described above, since the intercooler 10 and the duct 20 are surface-contacted, all of the air flowing into the duct 20 can flow to the intercooler 10.

In order to ensure the surface-contact of the intercooler 10 and the duct 20, the duct 20 includes a fastening plate 21 extending from the duct 20 rearwards toward the intercooler 10.

The fastening plate 21 may be mounted at a rear end of the duct 20, extending rearwards from which the air is discharged from duct 20 toward the intercooler 10.

The fastening plate 21 may be installed to surround the upper and lower surfaces of the intercooler 10. As the fastening plate 21 is formed to surround the upper and lower surfaces of the intercooler 10, the intercooler 10 and the duct 20 may be surface-contacted.

In order to fasten the fastening plate 21 to the intercooler 10, fastening protrusions 11 may be formed on the intercooler 10, and fastening holes 21b into which the fastening protrusions 11 are inserted may be formed at the fastening plate 21. When the duct 20 slides toward and engages to the intercooler 10, the fastening protrusions 11 are fitted into the fastening holes 21b so that the duct 20 and the intercooler 10 are assembled.

Figure 8:
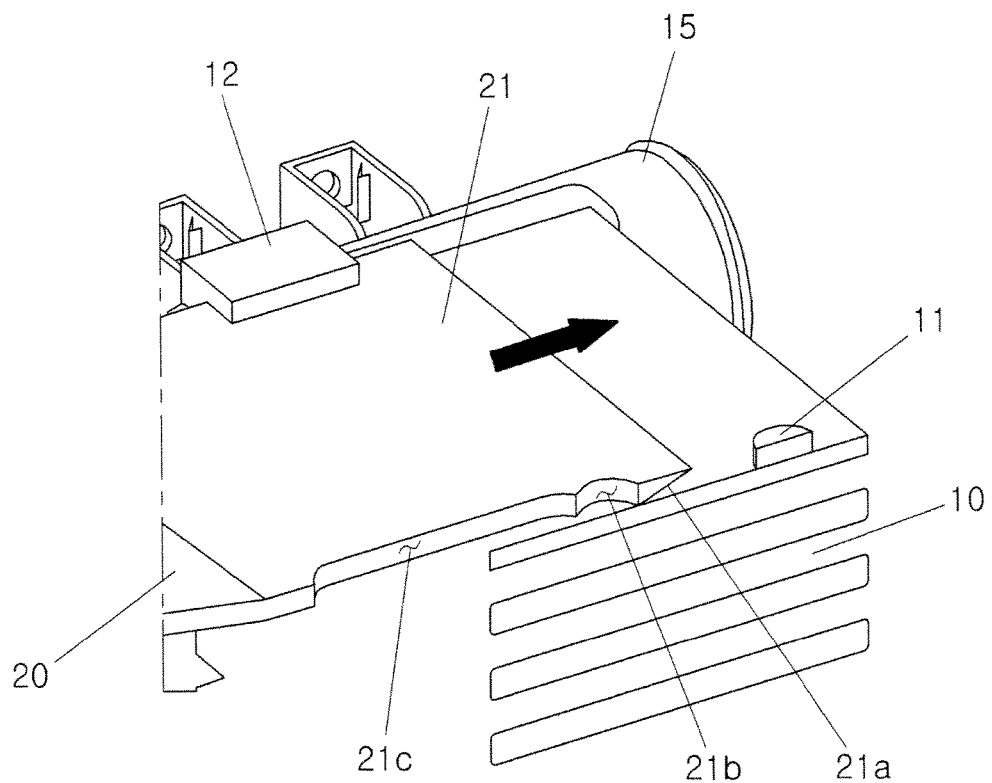
FIG. 8 is a partially enlarged perspective view showing a fastening state of fastening protrusions and fastening holes according to the intercooler assembly for a vehicle in accordance with the embodiment of the present invention.

Referring to FIG. 8, the duct 20 can readily slide toward the intercooler 10 for insertion and, the fastening protrusions 11 can be fitted to the fastening holes 21b due to a slope 21a formed at a rear end of the fastening plate 21 as contacting the fastening protrusions 11. The slope 21a may be formed toward upper and lower surfaces of the intercooler 10 at rear ends of the fastening plate 21 and slanted towards a front end of the duct 20, such that a thickness of the fastening plate 21 decreases toward the rear end of the fastening plate 21.

Further, a sliding slot 21c may be formed longitudinally to communicate with the fastening holes 21b on the fastening plate 21. The sliding slot 21c is formed at a front side of the fastening holes 21b, that is, toward the front end of the duct 20.

A stepped portion may be formed between the fastening holes 21b and the sliding slot 21c at which the fastening holes 21b and the sliding slot 21c communicated with each other as shown in FIG. 8. In order to maintain a fastening state of the duct 20 to the intercooler 10, the fastening protrusions 11 are inserted into the fastening holes 21b. However, under a low speed collision, the fastening holes 21b and the fastening protrusions 11 are separated from each other, and the sliding slot 21c is guided by the fastening protrusions 11 so as to push the duct 20.

Figure 5:
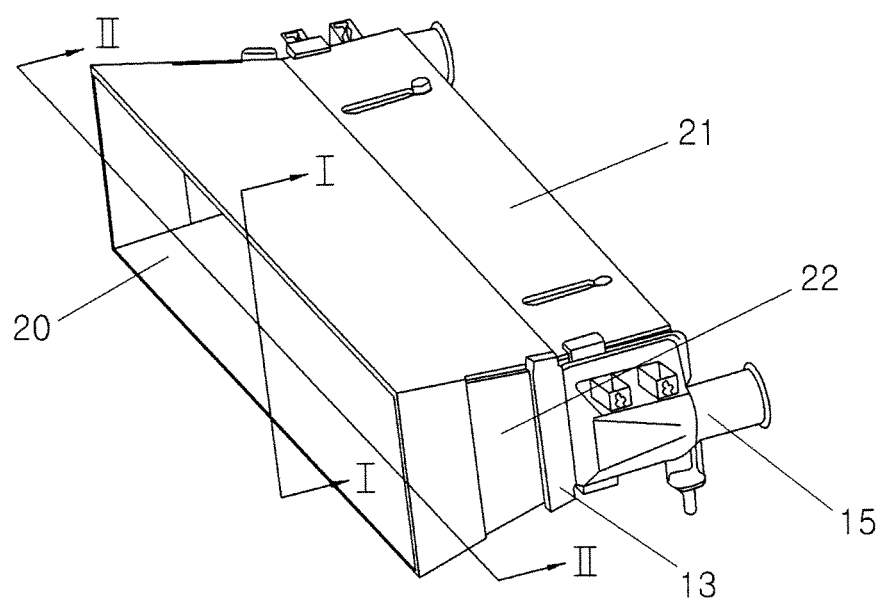
FIG. 5 is a perspective view of an intercooler assembly for a vehicle in accordance with an embodiment of the present invention.

The fastening plate 21 may be formed around the entire periphery of the duct 20, or it may be formed only on the partial periphery of the duct 20. That is, as shown in FIG. 5, the fastening plate 21 may be mounted partially to the duct 20 to avoid a pipe 15 which allows pressurized air to flow into and out of the intercooler 10. The fastening plate 21 may be formed at the duct 20 such that the fastening plate 21 is coupled to an upper and a lower surface of the intercooler 10 where the pipe 15 is not provided.

If the intercooler 10 is arranged in the vertical direction (perpendicularly with respect to FIG. 5), the fastening plate 21 may be formed on the right and left in the duct 20.

When the fastening plate 21 is fastened in the intercooler 10, the fastening guide 12 may fix both ends of the fastening plate 21. The fastening guide 12 protrudes from a side of the intercooler 10, and an upper portion of the fastening guide 12 is bent, and thus, when the fastening plate 21 is fastened to the intercooler 10, the both side ends of the fastening plate 21 is fixed by pressing of the fastening guide 12.

On the other hand, the intercooler 10 and the duct 20 may be coupled to each other through a sealing guide 13 and a flexible connector 22 at which the pipe 15 is mounted to the intercooler 10.

The sealing guide 13 may be formed at the opposite side of the pipe 15 on the intercooler 10 at which the fastening plate 21 does not surface-contact the intercooler 10. The sealing guide 13 may extend from a front side of the intercooler 10 in a predetermined length at the side of the intercooler 10.

The flexible connector 22 may be provided at the rear end in the duct 20. The flexible connector 22 may extend from the rear end of the duct 20 at which the fastening plate 21 is not formed. The flexible connector 22 is made of a deformable material such as synthetic rubber. Since the flexible connector 22 deforms at the low speed collision of a vehicle, it is possible to prevent deformation of the intercooler 10.

The flexible connector 22 may have an outer surface thereof in contact with an inner surface of the sealing guide 13. When the duct 20 is fastened to the intercooler 10 using the fastening plate 21, the flexible connector 22 may be fastened in order to be in contact with the inner surface of the sealing guide 13.

Hereinafter, a process of the intercooler assembly for vehicle according to the present disclosure will be described.

Figure 6:
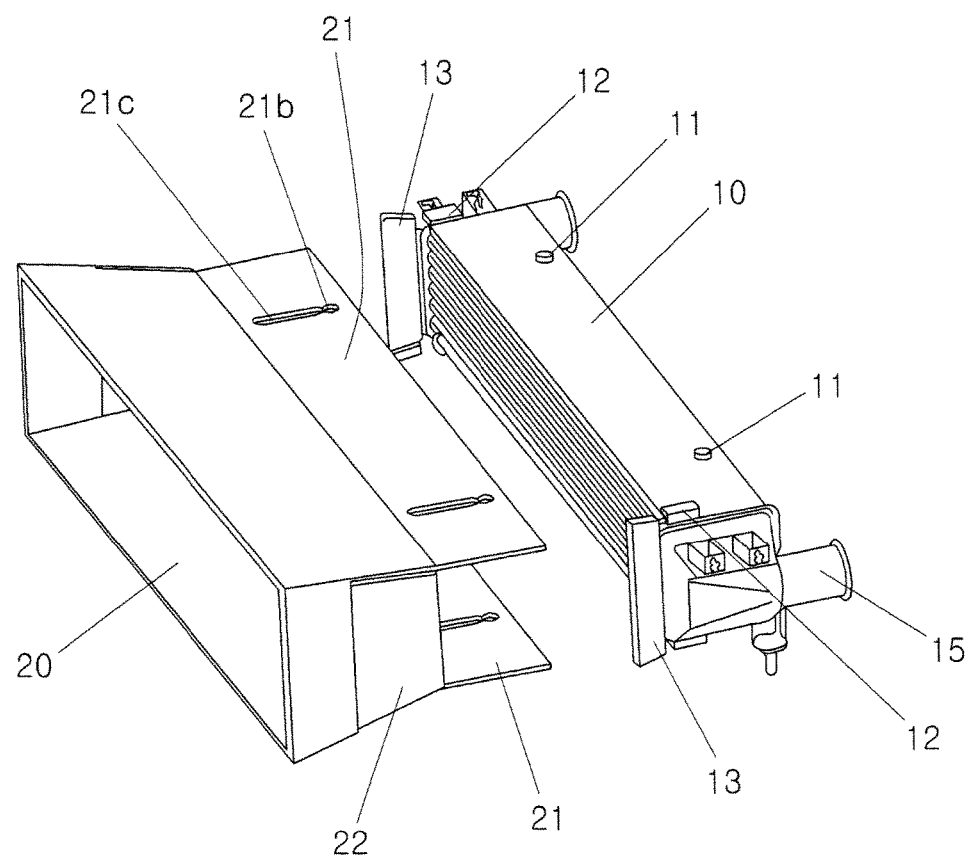
FIG. 6 is an exploded perspective view of an intercooler assembly for a vehicle in accordance with the embodiment of the present inventive concept.

As shown in FIG. 6, if the intercooler 10 is separated from the duct 20, the duct 20 may be coupled to the intercooler 10 by sliding into it. That is to say, the duct 20 is coupled to the intercooler 10 so as for the fastening plate 21 of the duct 20 to surround the upper and lower surfaces of the intercooler 10.

Figure 7:
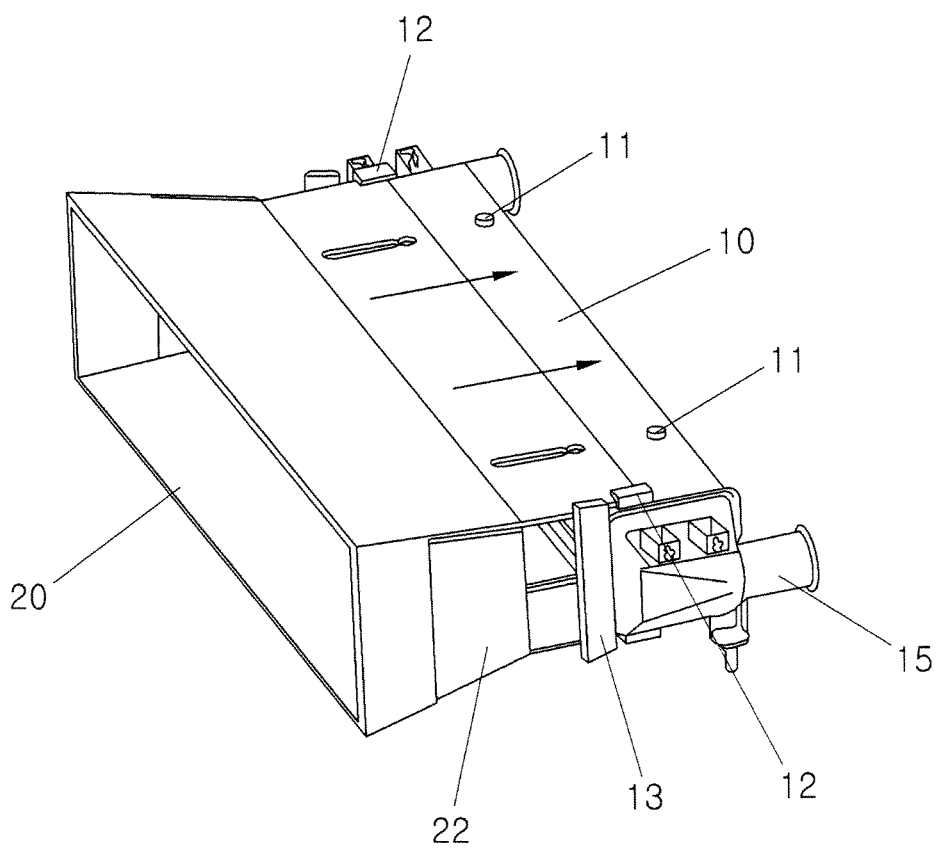
FIG. 7 is a perspective view showing a state assembling the intercooler with a duct according to the intercooler assembly for a vehicle in accordance with an embodiment of the present inventive concept.

When sliding the duct 20 onto the intercooler 10, as shown in FIG. 8, the end of the fastening plate 21 abuts on the fastening protrusions 11 of the intercooler 10. Since the fastening plate 21 has the slope 21a, the fastening plate 21 can be easily inserted to the intercooler 10 by the slope 21a. Then, the fastening protrusions 11 are inserted into the fastening holes 21b (refer to. FIG. 7) so that the intercooler 10 and the duct 20 can be fastened each other.

As described above, in the process of combining the duct 20 to the intercooler 10 without using a separate tool, it may be easy to assemble by sliding the duct 10 onto the intercooler 10.

When the duct 20 is fitted to the intercooler 10, since the fastening plate 21 of the duct 20 and the flexible connector 22 surface-contact with the upper and lower surfaces of the intercooler 10, fuel efficiency is improved as cooling efficiency of the intercooler 10 is improved by preventing a leakage of air between the intercooler 10 and the duct 20.

Figure 9:
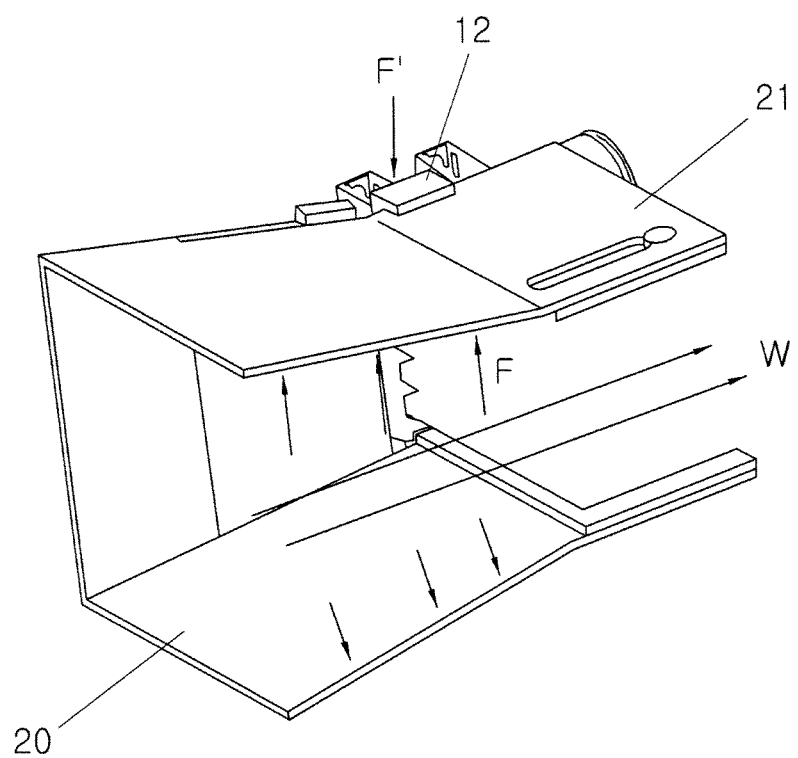
FIG. 9 is an incision view showing a sealing principle of the intercooler according to the intercooler assembly for a vehicle in accordance with the embodiment of the present inventive concept.

FIG. 9 describes sealing between the fastening plate 21 and the intercooler 10. When the air flows into an interior of the duct 20 (see the arrow W), force F is generated toward the outside by the air flow. At this time, force F' in an inner direction is generated from the fastening guide 21 as the fastening plate 21 reacts with the force F, so that the fastening plate 21 and the upper and lower surfaces of the intercooler 10 surface-contact and may be sealed.

Figure 10:
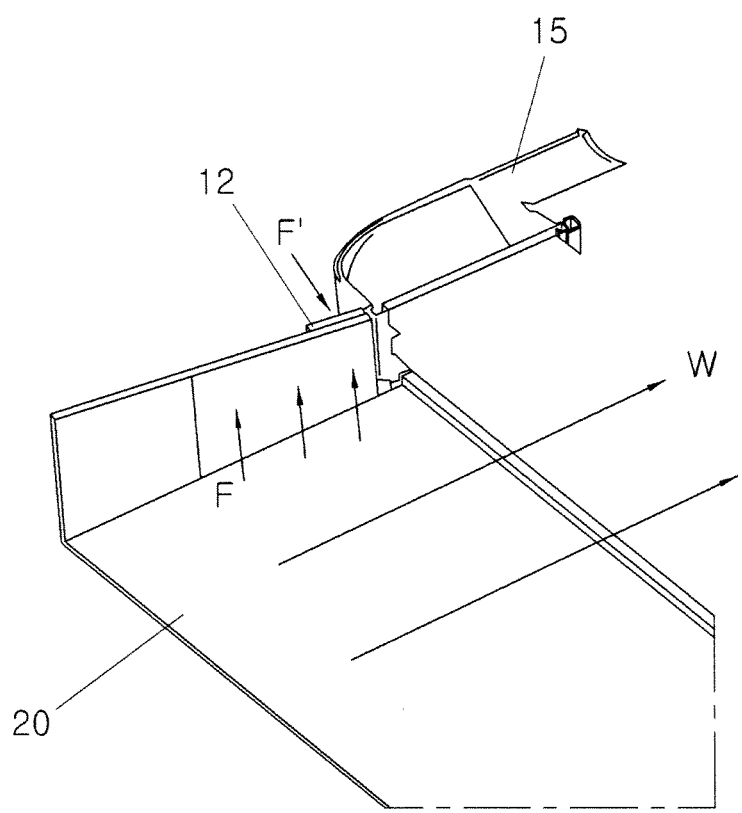
FIG. 10 is an incision view showing a sealing principle of the intercooler according to the intercooler assembly for a vehicle in accordance with the embodiment of the present inventive concept.

FIG. 10 shows sealing between the flexible connector 22 and the sealing guide 13. When the air flows into the interior of the duct 20 (see the arrow W), force F is generated toward the outside by the air flow. The flexible connector 22 and the sealing guide 13 may be sealed to be surface-contacted each other by reaction force F'.

By surface-contacting the duct 20 and the intercooler 10, the air leakage is prevented.

Figure 11:
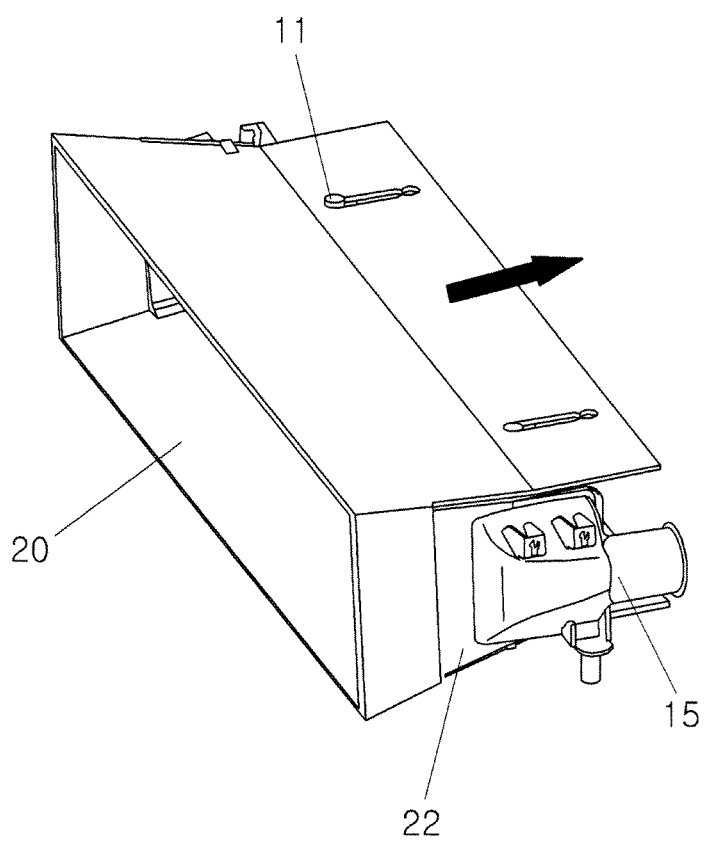
FIG. 11 is a perspective view showing transform at a low speed collision according to the intercooler assembly for a vehicle in accordance with the embodiment of the present invention.
Figure 12:
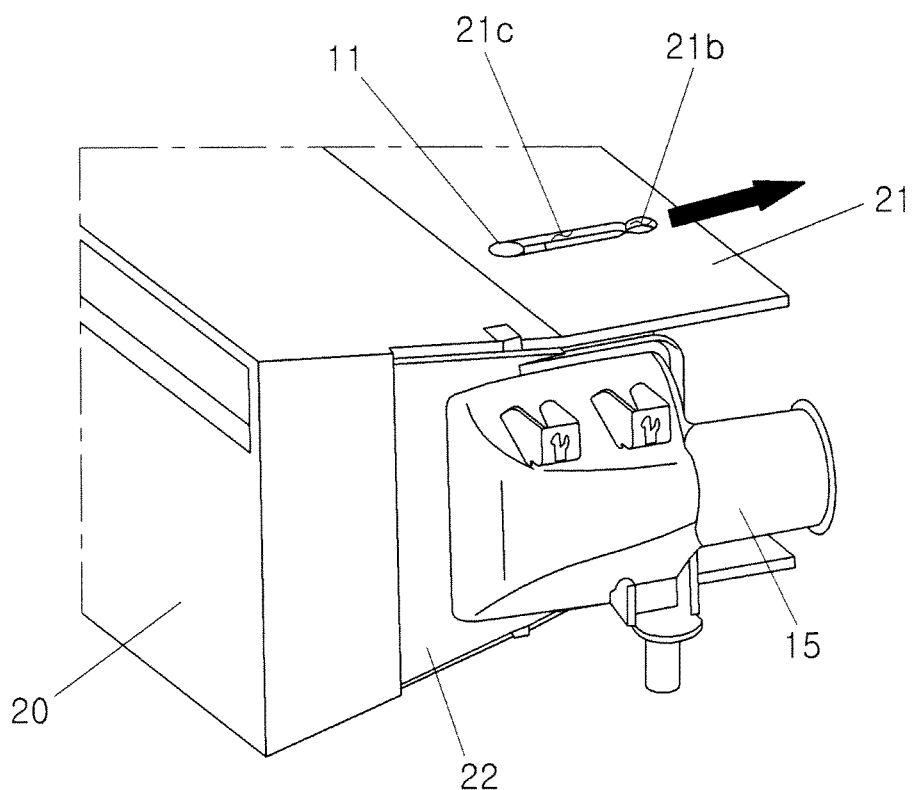
FIG. 12 is a partial enlarged perspective view of FIG. 11.

FIGS. 11 and 12 show a state which the duct 20 is pushed into the intercooler 10 at a low speed collision.

When a vehicle is in the low speed collision, the duct 20 is pushed toward a rear side of the vehicle by an impact. When the duct 20 is pushed, the duct 20 moves rearwards, however, the intercooler 10 may be maintained.

That is, when the duct 20 is pushed rearwards by the impact, fitting between the fastening holes 21b of the duct 20 and the fastening protrusions 11 of the intercooler 10 may be damaged, and while the duct 20 is pushed rearwards, the sliding slot 21c moves rearwards along the fastening protrusions 11.

In addition, since the flexible connector 22 is deformable, only the flexible connector 22 may be deformed as the duct 20 moves backwards.

Thus, when the duct 20 is pushed rearwards at the low speed collision, the fastening plate 21 moves toward the sliding slot 21c, and by deforming only the flexible connector 22, it is possible to prevent breakage of the intercooler 10.

What is claimed is:

1. An intercooler assembly for a vehicle comprising:
   an intercooler; and
   a duct detachably connected to a front side of the intercooler and guiding outside air into the intercooler,
   wherein the duct is in surface-contact with upper and lower surfaces of the intercooler at which the air flowing into the duct flows out to the intercooler,
   wherein the duct and the intercooler are disposed along a longitudinal direction of the vehicle at the same level and have a common central axis of extension along the longitudinal direction of the vehicle,
   wherein the contact surface between the duct and the intercooler is arranged in a width direction of the vehicle,
   wherein the duct comprises at least two fastening plates connected to the duct and extending from a rear end of the duct toward the intercooler, the at least two fastening plates surface-contacting the upper and lower surfaces of the intercooler,
   wherein the intercooler comprises fastening protrusions protruding from the upper and lower surfaces of the intercooler,
   wherein each of the at least two fastening plates has fastening holes, into which the fastening protrusions are fitted, and sliding slots communicating with the fastening holes and extending from the fastening holes toward a front side of the duct, and
   wherein the fastening holes communicate with the sliding slots via a stepped portion formed between the fastening holes and the sliding slots.

2. The intercooler assembly of claim 1, wherein each of the at least two fastening plates further includes a slope formed at arear end of each of the fastening plates, the slope being inclined toward the rear end of each of the fastening plate from the fastening holes such that a thickness of the fastening plate decreases toward the rear end of each of the fastening plate.

3. The intercooler assembly of claim 1, wherein the at least two fastening plates are provided on upper and lower sides of the duct to avoid contact with a pipe which is mounted to side surfaces of the intercooler.

4. The intercooler assembly of claim 3, wherein the intercooler comprises a fastening guide extending from left and right sides of the intercooler to which the pipe is mounted, the fastening guide having an end being bent inwardly toward the upper surface of the intercooler to support upper surfaces of each of the at least two fastening plates.

5. The intercooler assembly of claim 3, further comprising:
   a sealing guide mounted to left and right sides of the intercooler to which the pipe is mounted, the sealing guide contacting the rear end of the duct; and
   a flexible connector mounted to left and right sides of the duct, the flexible connector contacting the sealing guide.

6. The intercooler assembly of claim 5, wherein the duct is fastened to the intercooler and upper and lower surfaces of the flexible connector is in contact with an inner surface of the sealing guide.

7. The intercooler assembly of claim 1, wherein when the duct is pushed backward during low speed collision, the fastening protrusions passes through the stepped portion and the fastening protrusions are guided by locating in the sliding slots.

* * * * *